United States Patent [19]

Kunikane et al.

[11] Patent Number: 5,005,935
[45] Date of Patent: Apr. 9, 1991

[54] WAVELENGTH-DIVISION MULTIPLEXING OPTICAL TRANSMISSION SYSTEM

[75] Inventors: Tatsuro Kunikane, Yokohama; Takashi Yokota, Yamato, both of Japan

[73] Assignee: Fujitsu Limited, Kawasaki, Japan

[21] Appl. No.: 510,138

[22] Filed: Apr. 17, 1990

[30] Foreign Application Priority Data

Apr. 19, 1989 [JP] Japan .............................. 1-097498

[51] Int. Cl.$^5$ .............................................. G02B 6/28
[52] U.S. Cl. .................................. 350/96.16; 350/286
[58] Field of Search ................. 350/96.15, 96.16, 169, 350/170, 171, 172, 173, 174, 286; 370/1, 3

[56] References Cited

U.S. PATENT DOCUMENTS

| | | | |
|---|---|---|---|
| 3,704,061 | 11/1972 | Travis | 350/171 |
| 3,767,290 | 10/1973 | Lang et al. | 350/173 |
| 4,693,544 | 9/1987 | Yamasaki et al. | 350/96.16 |
| 4,824,200 | 4/1989 | Isono et al. | 350/96.16 |

Primary Examiner—Frank Gonzalez
Attorney, Agent, or Firm—Staas & Halsey

[57] ABSTRACT

A wavelength-division multiplexing optical transmission system is disclosed which transmits light of wavelengths $\lambda_1$, $\lambda_2$ and $\lambda_3$ ($\lambda_1 < \lambda_2 < \lambda_3$) by way of a single optical fiber. An optical multiplexer/demultiplexer of the filter type is used which includes a parallelogram prism, a first filter formed on a side face of the parallelogram prism, and second and third filters formed on the opposite side face of the parallelogram. Bidirectional optical fiber communications between the central telephone exchange side and a subscriber side can be achieved using such optical multiplexer/demultiplexer of the filter type. With the arrangement of the invention, an optical multiplexer/demultiplexer of the filter type can be produced at a low cost without the necessity of using a filter having a wide stopping band as a filter to be formed on a parallelogram prism.

6 Claims, 7 Drawing Sheets

WAVELENGTH-DIVISION MULTIPLEXING OPTICAL TRANSMISSION SYSTEM

BACKGROUND OF THE INVENTION

This invention relates to a wavelength-division multiplexing optical transmission system which includes an optical multiplexer/demultiplexer.

Multiplexing optical transmission systems are effective in order to increase the transmission capacity of a single optical transmission line, and an exemplary one of various forms of such multiplexing optical transmission systems is a wavelength-division multiplexing optical transmission system. In a wavelength-division multiplexing optical transmission system, different kinds of light having different wavelengths are transmitted in the opposite directions or in one direction by way of a single optical transmission line. An optical multiplexer/demultiplexer is used to combine or separate light of different wavelengths with or from each other to effect transmission or reception of a signal in a wavelength-division multiplexing optical transmission system. As a form of such optical multiplexer/demultiplexer, there is an optical multiplexer/demultiplexer of the filter type which includes filters each formed from a dielectric multilayer film and provided on the opposite side faces of a parallelogram prism.

As a wavelength-division multiplexing module which employs such an optical multiplexer/demultiplexer of the filter type as described just above, a module of the bulk type is employed frequently wherein an optical multiplexer/demultiplexer of the filter type is placed on and secured to a board together with some other optical parts such as a laser diode and a photodetector. A wavelength-division multiplexing optical transmission system is already provided wherein such wavelength-division multiplexing modules of the bulk type as described above are provided on the transmission side and the reception side and connected to each other by way of an optical fiber.

When it is intended to transit light of three different signals having different wavelengths by means of a conventional wavelength-division multiplexing optical transmission system, it is necessary to form, as a filter to be formed on a side face of a prism of a multiplexer/demultiplexer, a band pass filter or a filter having a wide stopping band. However, since a band pass filter is expensive, there is a problem that the optical transmission system requires a corresponding high cost. Meanwhile, a filter having a wide stopping band is difficult to produce, and accordingly, there is a problem that also it leads a high cost of the optical transmission system.

SUMMARY OF THE INVENTION

Accordingly, it is an object of the present invention to provide a wavelength-division multiplexing optical transmission system which overcomes such drawbacks of the prior art as described above and is easy to produce and inexpensive.

It is another object of the present invention to provide an optical multiplexer/demultiplexer of the filter type which is easy to produce and inexpensive.

In accordance with an aspect of the present invention, there is provided a wavelength-division multiplexing optical transmission system for transmitting light of wavelengths $\lambda_1$, $\lambda_2$ and $\lambda_3$ having a relationship $\lambda_1 < \lambda_2 < \lambda_3$ by way of a single optical fiber, which comprises a first prism having a first side face and a second side face opposite to the first side face, the first side face having a first filter formed thereon while the second side face has second and third filters formed thereon, a second prism having a third side face and a fourth side face opposite to the third side face, the third face having a fourth filter formed thereon while the fourth side face has fifth and sixth filters formed thereon, the first, third and fifth filters having a characteristic that they transit light of the wavelengths $\lambda_1$ and $\lambda_2$ but reflect light of the wavelength $\lambda_3$ while the second, fourth and sixth filters have another characteristic that they transmit light of the wavelengths $\lambda_2$ and $\lambda_3$ but reflect light of the wavelength $\lambda_1$, an optical fiber disposed such that an end thereof is opposed to the second filter of the first prism and the other end thereof is opposed to the fifth filter of the second prism, first optical device means provided adjacent the first side face of the first prism in an opposing relationship to the first filter and adapted to emit or receive light of the wavelength $\lambda_2$, second optical device means provided adjacent the first side face of the first prism such that a light path thereof may be directed to the third filter of the first prism and adapted to emit or receive light of the wavelength $\lambda_3$, third optical device means provided adjacent the second side face of the first prism such that a light path thereof may be directed to the second filter of the first prism and adapted to emit or receive light of the wavelength $\lambda_1$, fourth optical device means provided adjacent the third face of the second prism in an opposing relationship to the fifth filter and adapted to emit or receive light of the wavelength $\lambda_2$, fifth optical device means provided adjacent the third side face of the second prism such that a light path thereof may be directed to the sixth filter of the second prism and adapted to emit or receive light of the wavelength $\lambda_1$, and sixth optical device means provided adjacent the fourth side face of the second prism such that a light path thereof may be directed to the fifth filter of the second prism and adapted to emit or receive light of the wavelength $\lambda_3$.

Preferably, each of the first to third filters is a dielectric multilayer film filter formed from a total of a plural odd number of layers on the first prism such that each odd-numbered one of the layers is made of $TiO_2$ while each even-numbered one is made of $SiO_2$, and each of the fourth to sixth filters is a dielectric multilayer film filter formed from a total of a plural odd number of layers on the second prism such that each odd-numbered one of the layers is made of $TiO_2$ while each even-numbered one is made of $SiO_2$.

In accordance with another aspect of the present invention, there is provided an optical multiplexer/demultiplexer adapted to combine or separate light of wavelengths $\lambda_1$, $\lambda_2$ and $\lambda_3$ having a relationship $\lambda_1 < \lambda_2 < \lambda_3$, which comprises a parallelogram prism having a first side face and a second side face opposite to the first side face, a first filter formed on the first side face of the parallelogram prism and having a characteristic that the first filter transmits light of the wavelengths $\lambda_1$ and $\lambda_2$ but reflects light of the wavelength $\lambda_3$, a second filter formed on the second side face of the parallelogram prism and having a characteristic that the second filter transmits light of the wavelengths $\lambda_2$ and $\lambda_3$ but reflects light of the wavelength $\lambda_1$, and a third filter formed on the second side face of the parallelogram prism and having a characteristic that the third filter transmits light of the wavelengths $\lambda_1$ and $\lambda_2$ but reflects light of the wavelength $\lambda_3$.

In accordance with a further aspect of the present invention, there is provided an optical multiplexer/demultiplexer adapted to combine or separate light of wavelength $\lambda_1$, $\lambda_2$ and $\lambda_3$ having a relationship $\lambda_1 < \lambda_2 < \lambda_3$, which comprise a parallelogram prism having a first side face and a second side face opposite to the first side face, a first filter formed on the first side face of the parallelogram prism and having a characteristic that the first filter transmits light of the wavelengths $\lambda_2$ and $\lambda_3$ but reflects light of the wavelength $\lambda_1$, a second filter formed on the second side face of the parallelogram prism and having a characteristic that the second filter transmits light of the wavelengths $\lambda_1$ and $\lambda_2$ but reflects light of the wavelength $\lambda_3$, and a third filter formed on the second side face of the parallelogram prism and having a characteristic that the third filter transmits light of the wavelengths $\lambda_2$ and $\lambda_3$ but reflects light of the wavelength $\lambda_1$.

The above and other objects, features and advantages of the present invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Since it is considered desirable to describe construction and drawbacks of the prior art before preferred embodiments of the present invention are described in order to facilitate understanding of the invention, the prior art is first described in detail with reference to the drawings.

First, a wavelength-division multiplexing module which is employed in a conventional wavelength-division multiplexing optical transmission system is described with reference of FIGS. 1 and 2. The wavelength-division multiplexing module shown includes a light emitting element assembly 20 which includes a light emitting element 21 such as a laser diode and a collimate lens 22 both fixedly held in a predetermined positional relationship in a cylindrical casing 23. The wavelength-division multiplexing module further includes a photodetector assembly 24 which includes a photodetector 25 such as a photodiode and a condensing lens 26 both fixedly held in a predetermined positional relationship in another cylindrical casing 27. The wavelength-division multiplexing module further includes a pair of optical fiber assemblies 28 and 29 which include optical fibers 32 and 33 inserted in and secured to small holes in ferrules 30 and 31 and collimate lenses 34 and 35, respectively. The optical fibers 32 and 33 and the collimate lenses 34 and 35 are fixedly held in a predetermined positional relationship in cylindrical casings 36 and 37, respectively.

The assemblies 20, 24, 28 and 29 are secured to an upper flat face of a board 38, for example, by means of soldering. A parallelogram prism 39 is also secured to the upper face of the board 38 and has a pair of filters 40 and 41 formed on a pair of opposite side faces thereof. A signal obtained by photoelectric conversion by the photodetector 25 is amplified by a preamplifier 42 in the neighborhood of the photodetector assembly 24, and an output of the preamplifier 42 is taken out by way of a pair of a plurality of connecting pins 43 which extend downwardly through and from the board 38. A drive signal is supplied to the light emitting element 32 similarly by way of another pair of the connecting pins 43. A casing 44 for the wavelength-division multiplexing module is shown in phantom in FIG. 1.

Figure 2:
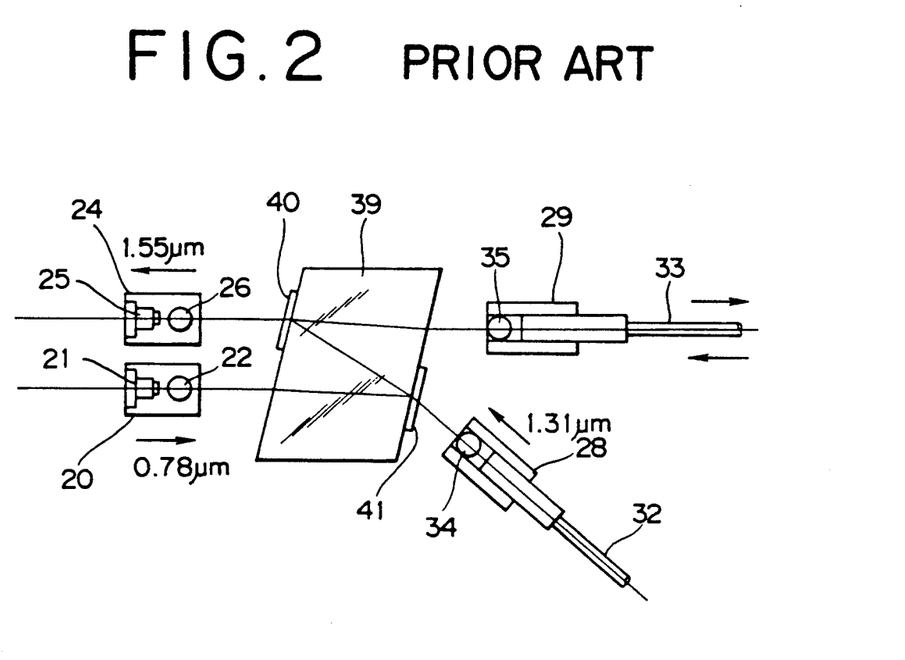
Figure 3A:
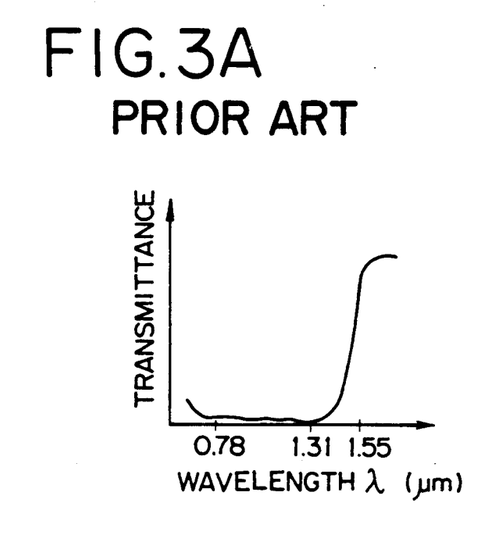
FIGS. 3A and 3B are graphs showing characteristics of filters employed in the conventional wavelength-division multiplexing module shown in FIG. 1.
Figure 3B:
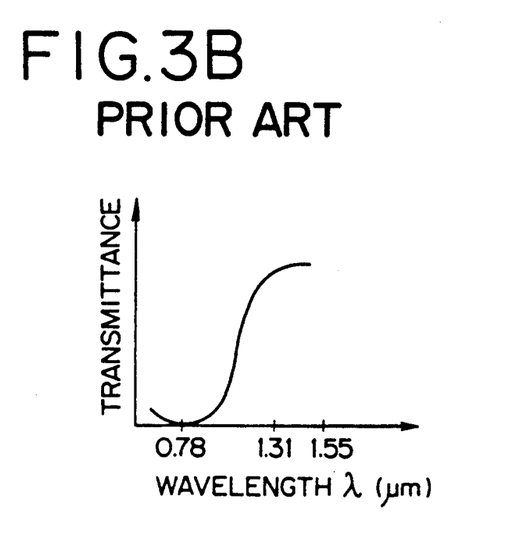

Referring to FIG. 2, it is assumed now that the light emitting element assembly 20 emits light of a wavelength 0.78 μm; the photodetector assembly 24 detects light of a wavelength 1.55 μm; the optical fiber assembly 28 emits light of a wavelength 1.31 μm; and light of the wavelengths 0.78 μm, 1.31 μm and 1.55 μm transmits in the optical fiber 33. It is further assumed that the filter 40 has a characteristic that is reflects light of the wavelengths 0.78 μm and 1.31 μm but transmits light of the wavelength 1.55 μm as seen in FIG. 3A while the other filter 41 has another characteristic that it reflects light of the wavelength 0.78 μm but transmits light of the wavelength 1.31 μm as seen in FIG. 3B. Operation of the wavelength-division multiplexing module having such a construction as described above is described subsequently.

Light of the wavelength 0.78 μm from the light emitting element 21 which is driven to effect modulation by a driver circuit not shown is introduced into the prism 39, reflected by the filter 41 and then by the filter 40, and introduced into the optical fiber assembly 29 whereupon it is condensed by the lens 35 and introduced into the optical fibers 33. Meanwhile, emergent light of the wavelength 1.31 μm emitted from an end face of the optical fiber 32 is converted into a collimated beam of light by the lens 34 and then passes through the filter 41, and then is introduced into the prism 39, reflected by the filter 40 and introduced into the optical fiber assembly 29 whereupon it is condensed by the lens 34 and introduced into the optical fiber 33. On the other hand, light of the wavelength 1.55 μm emerging from an end face of the optical fiber 33 is converted into a collimated beam of light by the lens 35 and introduced into the prism 39. Then, the light passes through the filter 40 without being reflected by the latter and is introduced into the photodetector assembly 24 whereupon it is condensed by the lens 26 and introduced into the photodector 25. Where the wavelength-division multiplexing module having such a construction as described above is used, a plurality of kinds of light having different wavelengths can be transmitted or received.

Figure 4:
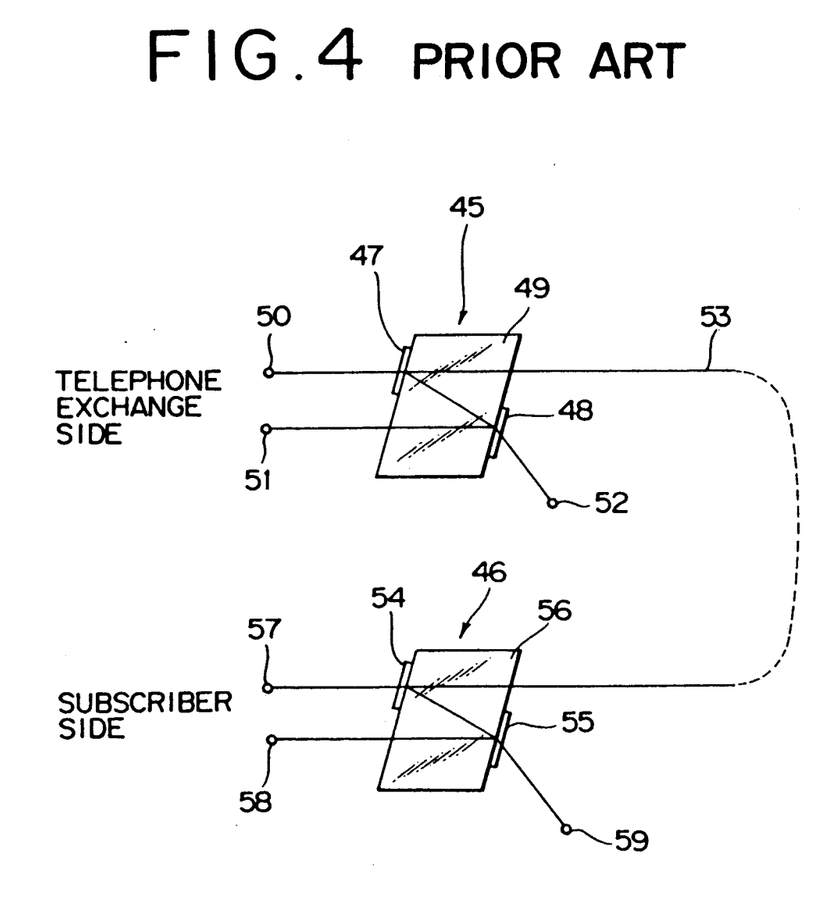
FIG. 4 is a schematic illustration showing a conventional wavelength-division multiplexing optical transmission system which is constructed using the wavelength-division multiplexing module shown in FIG. 1.

Construction and operation of a conventional wavelength-division multiplexing optical transmission system are described subsequently with reference to FIG. 4. The wavelength-division multiplexing optical transmission system shown includes an optical multiplexer/demultiplexer 45 on the central telephone exchange side and another optical multiplexer/demultiplexer 46 on the subscriber side. The optical multiplexer/demultiplexer 45 on the central telephone exchange side includes a prism 49 having a pair of filters 47 and 48 formed on a pair of opposite side faces thereof. A laser diode assembly 50 for emitting light of the wavelength 0.78 μm is disposed in an opposing relationship to the filter 47, and another laser diode assembly 51 for emitting light of the wavelength 1.55 μm is disposed on the same side of the prism 45 as the laser diode assembly 50. A photodiode assembly 52 for detecting light of the wavelength 1.31 μm is disposed in an opposing relationship to the filter 48, and an end of a common optical fiber 53 connected to the optical multiplexer/demultiplexer 46 on the subscriber side is disposed on the same side of the prism 49 as the photodiode assembly 52. The filter 47 has such a characteristic as seen in FIG. 5B while the other filter 48 has such a characteristic as seen in FIG. 5A.

The optical multiplexer/demultiplexer 46 on the subscriber side includes a prism 56 having a pair of filters 54 and 55 formed on a pair of opposite side faces thereof. A laser diode assembly 57 for emitting light of the wavelength 1.31 μm is disposed in an opposing relationship to the filter 54, and a photodiode assembly 58 for detecting light of the wavelength 1.55 μm is disposed on the same side of the prism 46 as the laser diode assembly 57. Another photodiode assembly 59 for detecting light of the wavelength 0.178 μm is disposed in an opposing relationship to the filter 55, and the other end of the common optical fiber 53 which is connected to the optical multiplexer/demultiplexer 45 on the central telephone exchange side is disposed on the same side of the prism 46 as the photodiode assembly 59. The filter 54 has such a characteristic as seen in FIG. 5A while the other filter 55 has such a characteristic as seen in FIG. 5B.

In the wavelength-division multiplexing optical transmission system, light of the wavelength 0.78 μm emitted from the laser diode assembly 50 on the central telephone exchange side passes through the filter 47 and is transmitted by way of the common optical fiber 53 and reflected by the filter 54, whereafter it transmits through the filter 55 and is detected by the photodiode assembly 59 on the subscriber side. Light of the wavelength 1.55 μm emitted from the laser diode assembly 51 on the central telephone exchange side is reflected successively by the filters 48 and 47 and transmitted by way of the common optical fiber 53, whereafter it is reflected successively by the filters 54 and 55 and detected by the photodiode assembly 58 on the subscriber side. Further, light of the wavelength 1.31 μm emitted from the laser diode assembly 57 on the subscriber side passes through the filter 54 and is transmitted by way of the common optical fiber 53 and reflected by the filter 47, whereafter it passes through the filter 48 and then is detected by the photodiode assembly 52 on the central telephone exchange side. Optical communications are performed in this manner between the central telephone exchange side and the subscriber side.

Figure 5A:
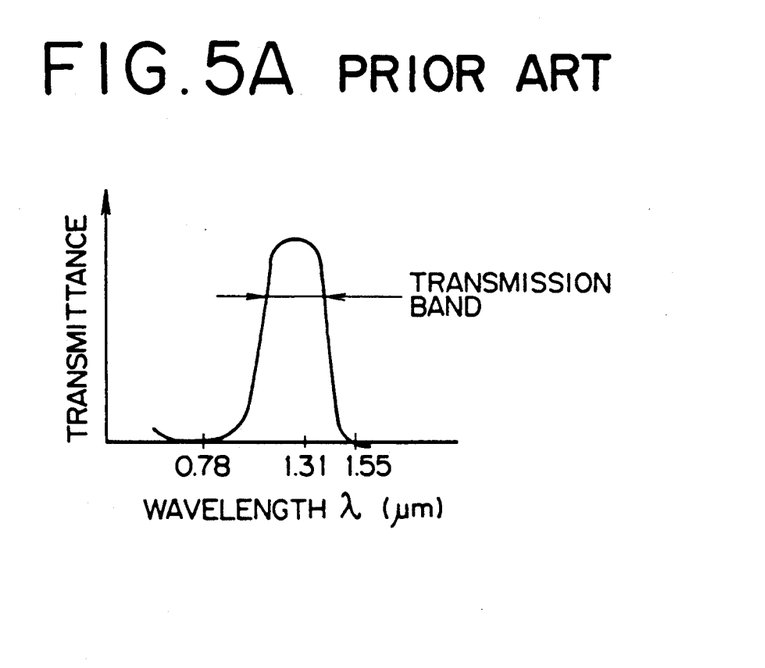
FIGS. 5A and 5B are graphs showing characteristics of filters employed in the optical transmission system of FIG. 4.
Figure 5B:
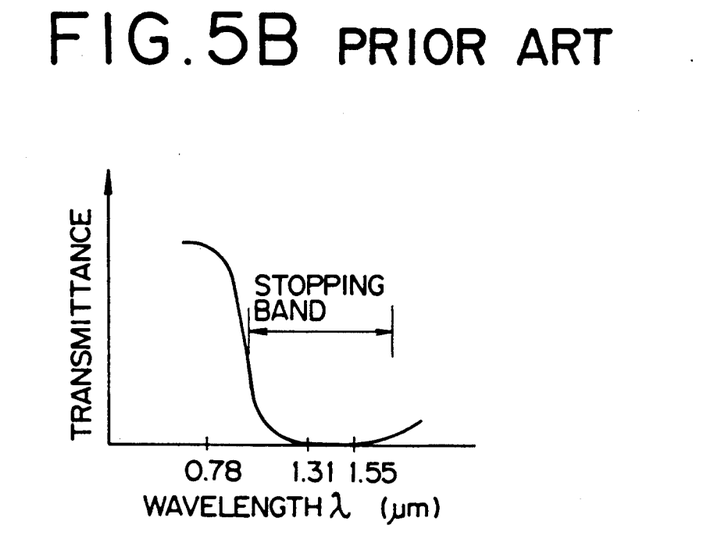

However, the conventional wavelength-division multiplexing optical transmission system described above has the following drawbacks because a band pass filter having such a characteristic as seen in FIG. 5A or another filter having such a wide stopping band as seen in FIG. 5B is employed as a filter of an optical multiplexer/demultiplexer of the filter type. In particular, since a band pass filter is expensive, there is a drawback that the optical transmission system is produced at a correspondingly high cost. On the other hand, a filter having a wide stopping band has drawbacks that it is difficult to produce and that it also requires a correspondingly high cost.

The present invention has been made to solve such problems of the prior art as described above. In the following, the present invention is described in detail with reference to the drawings.

Figure 6:
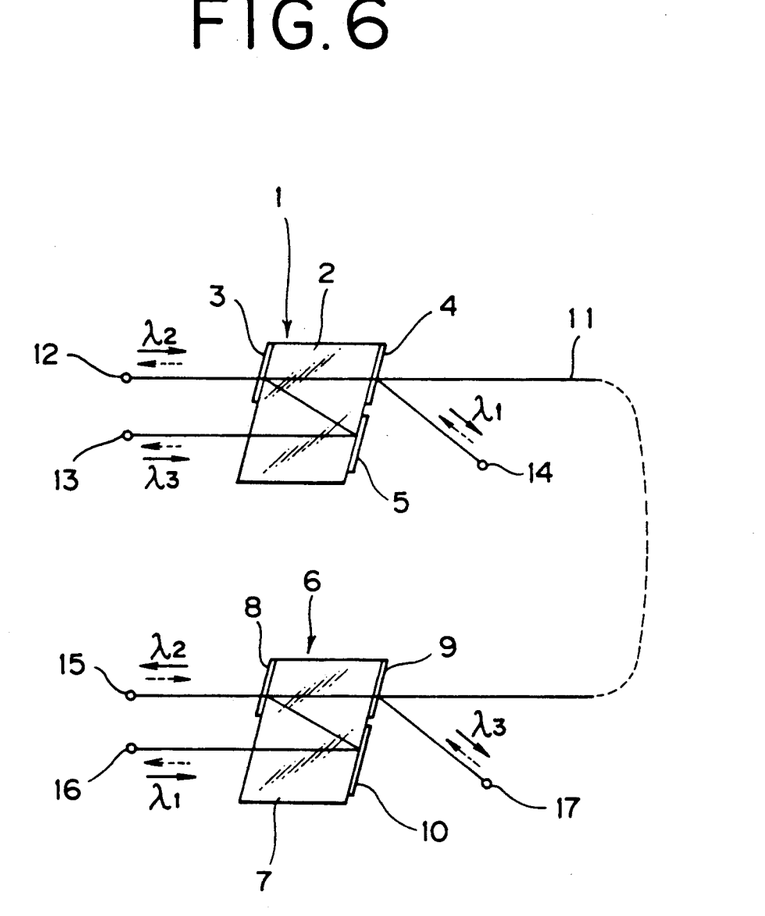
FIG. 6 is a schematic view showing construction in principle of a wavelength-division multiplexing optical transmission system of the present invention.

First, a principle of a wavelength-division multiplexing optical transmission system of the present invention will be described with reference to a schematic view of FIG. 6. The wavelength-division multiplexing optical transmission system is suitable to transmit light of wavelengths $\lambda_1$, $\lambda_2$ and $\lambda_3$ ($\lambda_1 < \lambda_2 < \lambda_3$) by way of a single optical fiber. The wavelength-division multiplexing optical transmission system includes a first optical multiplexer/demultiplexer 1 which includes a parallelogram prism 2, a first filter 3 formed on a side face of the parallelogram prism 2, and a second filter 4 and a third filter 5 formed on the opposite side face of the parallelogram prism 2. The wavelength-division multiplexing optical transmission system further includes a second optical multiplexer/demultiplexer 6 which includes a parallelogram prism 7, a fourth filter 8 formed on a side face of the parallelogram prism 7, and a fifth filter 9 and a sixth filter 10 formed on the opposite side face of the parallelogram prism 7. The first, third and fifth filters 3, 5 and 9 have a characteristic that they transmit light of the wavelengths $\lambda_1$ and $\lambda_2$ but reflect light of the wavelength $\lambda_3$ while the second, fourth and sixth filters 4, 8 and 10 transmit light of the wavelengths $\lambda_2$ and $\lambda_3$ but reflect light of the wavelength $\lambda_1$. An optical fiber 11 is disposed such that it is opposed at an end thereof to the second filter 4 and at the other end thereof to the fifth filter 9. The first optical multiplexer/demultiplexer 1 and the second optical multiplexer/demultiplexer 2 are connected to each other by way of the optical fiber 11.

The characteristics of the first to sixth filters with respect to the wavelengths $\lambda_1$, $\lambda_2$ and $\lambda_3$ are indicated in Table 1 below.

TABLE 1

| | Filter | |
|---|---|---|
| Wavelength | 1st Filter<br>3rd Filter<br>5th Filter | 2nd Filter<br>4th Filter<br>6th Filter |
| $\lambda_1$ | Transmission | Reflection |
| $\lambda_2$ | Transmission | Transmission |
| $\lambda_3$ | Reflection | Transmission |

($\lambda_1 < \lambda_2 < \lambda_3$)

A first optical device 12 is disposed on one side of the first parallelogram prism 2 in an opposing relationship to the first filter 3 on the first parallelogram prism 2 such that light of the wavelength $\lambda_2$ may be emitted from or received by the first optical device 12. A second optical device 13 is disposed on the same side of the first parallelogram prism 2 as the first optical device 12 such that a light path thereof may be directed to the third filter 5 of the first parallelogram prism 2 and light of the wavelength $\lambda_3$ may be emitted from or received by the second optical device 13. Further, a third optical device 14 is provided on the other side of the first parallelogram device 2 such that a light path thereof may be directed to the second filter 4 of the first parallelogram prism 2 and light of the wavelength $\lambda_1$ may be emitted from or received by the third optical device 14.

On the other hand, a fourth optical device 15 is disposed on one side of the second parallelogram prism 7 in an opposing relationship to the fifth filter 8 on the second parallelogram prism 7 such that light of the wavelength $\lambda_2$ may be emitted from or received by the second optical device 15. A fifth optical device 16 is disposed on the same side of the second parallelogram prism 7 as the fourth optical device 15 such that a light path thereof may be directed to the sixth filter 10 of the second parallelogram prism 7 and light of the wavelength $\lambda_1$ may be emitted from or received by the fifth optical device 16. Further, a sixth optical device 17 is provided on the opposite side of the second parallelogram device 7 such that a light path thereof may be directed to the fifth filter 9 of the second parallelogram prism 7 and light of the wavelength $\lambda_3$ may be emitted from or received by the sixth optical device 17.

Subsequently, operation of the wavelength-division multiplexing optical transmission system of the present invention having such a construction as described above is described. For the convenience of description, it is assumed that the first, second and fifth optical devices 12, 13 and 16 are optical devices for emitting light while the third, fourth and sixth optical devices 14, 15 and 17 are optical devices for receiving light. Emergent light from the first optical device 12 passes through the first filter 3 and then through the second filter 4 and is then introduced into the end of the optical fiber 11 opposing to the second filter 4 so that it is thereafter transmitted by way of the optical fiber 11. The transmission light is emitted from the other end of the optical fiber 11 and then passes through the fifth filter 9 and then through the fourth filter 8 so that it is introduced into the fourth optical device 15.

Meanwhile, emergent light from the second optical device 13 is reflected successively by the third and first filters 5 and 3 and then passes through the second filter 4, whereafter it is introduced into the end of the optical fiber 11 opposing to the second filter 4 so that it is thereafter transmitted by way of the optical fiber 11. The transmission light is emitted from the other end of the optical fiber 11 and then is reflected by the fifth filter 9 without passing through the second parallelogram prism 7 so that it is introduced into the sixth optical device 17.

Emergent light form the fifth optical device 16 is reflected successively by the sixth and fourth filters 10 and 8 and then passes through the fifth filter 9, whereafter it is introduced into the end of the optical fiber 11 opposing to the fifth filter 9 so that it is thereafter transmitted by way of the optical fiber 11. The transmission light is emitted from the other end of the optical fiber 11 and is then reflected by the second filter 4 without passing through the first parallelogram prism 2 so that it is introduced into the third optical device 14.

As described so far, according to the wavelength-division multiplexing optical transmission system of the present invention, light of the wavelengths $\lambda_1$, $\lambda_2$ and $\lambda_3$ can be transmitted by way of the single optical fiber 11 and bidirectional wavelength-division multiplexing optical communications can be accomplished. Further, with the construction of the embodiment, the filters formed on the first and second parallelogram prisms need not be band pass filters and need not have a wide stopping band, and accordingly, they can be produced readily and at a reduced cost.

Figure 7:
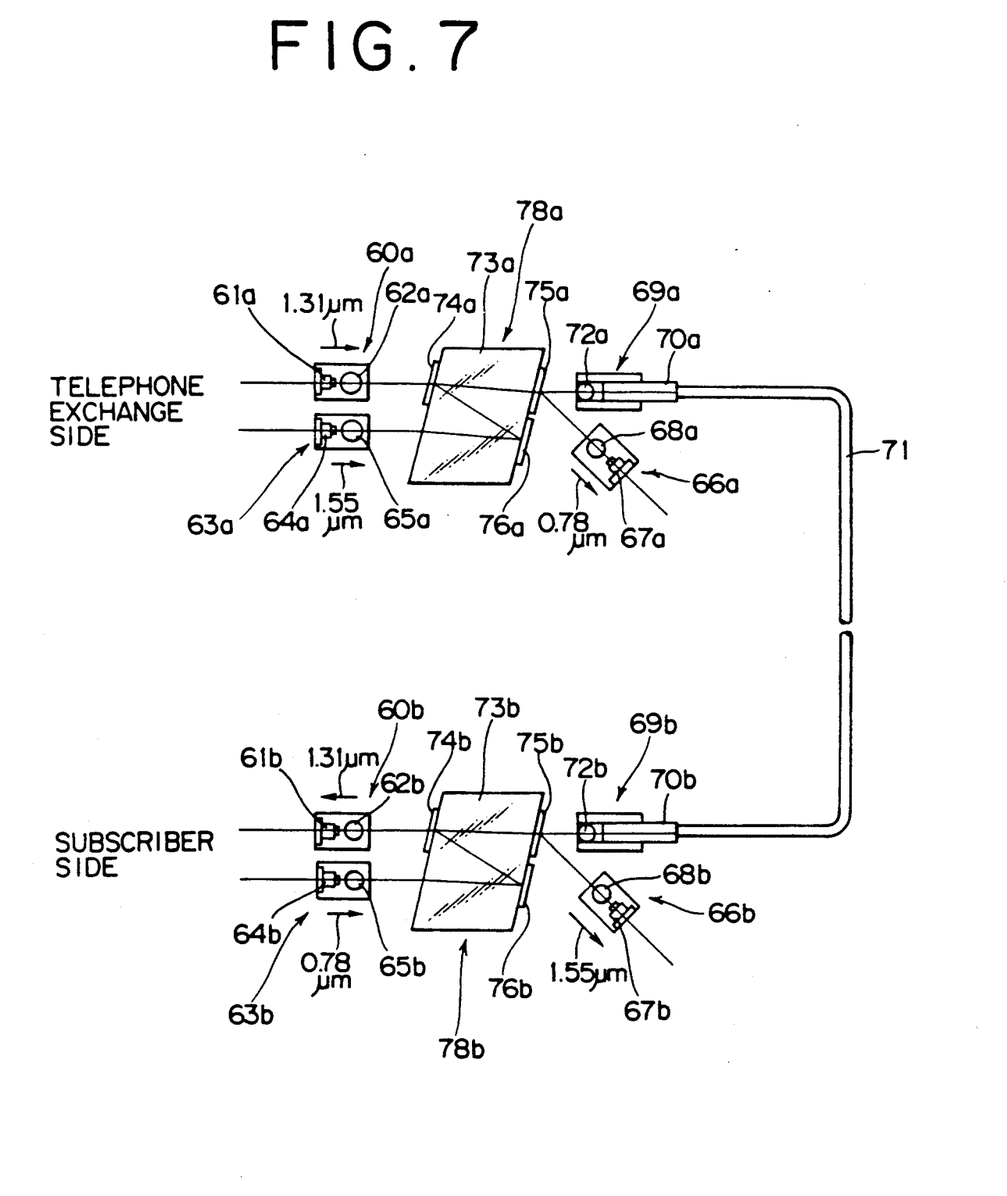
FIG. 7 is a schematic view showing a wavelength-division multiplexing optical transmission system to which the present invention is applied.

A wavelength-division multiplexing optical transmission system of a preferred embodiment of the present invention is described in the following with reference to FIG. 7. A wavelength-division multiplexing module on the central telephone exchange side of the wavelength-division multiplexing optical transmission system is first described. The wavelength-division multiplexing module includes a light emitting element assembly 60a which includes a light emitting element 61a such as a laser diode for emitting light of a wavelength 1.31 $\mu$m and a collimate lens 62a both fixedly held in a predetermined positioned relationship in a cylindrical casing. The wavelength-division multiplexing module includes another light emitting element assembly 63a which includes a light emitting element 64a such as a laser diode for emitting light of another wavelength 1.55 $\mu$m and a collimate lens 65a both fixedly held in a predetermined positional relationship in another cylindrical casing. The wavelength-division multiplexing module further includes a photodetector assembly 66a which includes a photodetector 67a such as a photodiode for detecting light of a further wavelength 0.78 $\mu$m and a condensing lens 68a both fixedly held in a predetermined positional relationship in a further cylindrical casing. The wavelength-division multiplexing module further includes a fiber collimator 69a which includes a ferrule 70a having a small hole formed therein in which an end portion of an optical fiber 71 and a condensing and collimating lens 72a are securely inserted in a predetermined positional relationship in a still further casing. The assemblies 60a, 63a and 66a and fiber collimator 69a are secured to an upper flat face of a board not shown, for example, by means of soldering.

Figure 8A:
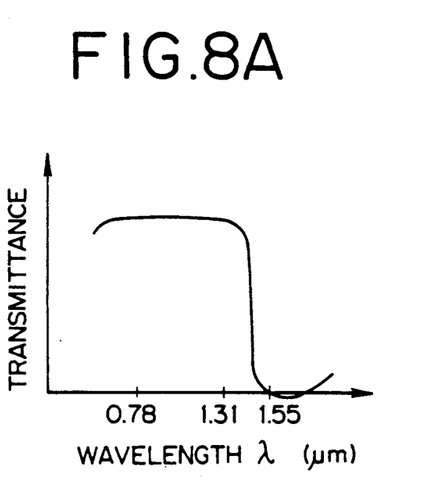
FIGS. 8A and 8B are graphs showing characteristics of filters employed in the wavelength-division multiplexing optical transmission system shown in FIG. 7.
Figure 8B:
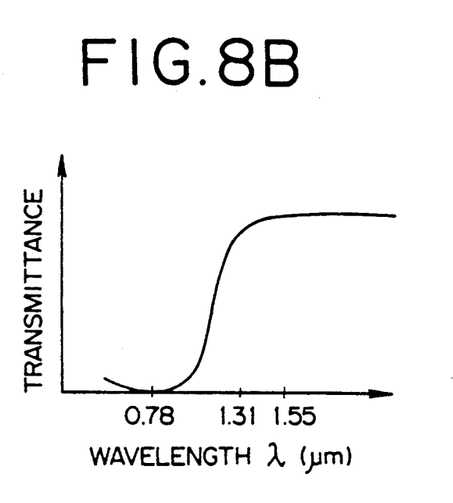

The wavelength-division multiplexing module further includes an optical multiplexer/demultiplexer 78a of the filter type which includes a parallelogram prism 73a secured to the upper face of the board, a dielectric multilayer film filter 74a formed on a side face of the parallelogram prism 73a, and a pair of dielectric multilayer film filters 75a and 76a formed on the opposite side face of the parallelogram prism 73a. Each of the filters 74a, 75a and 76a is formed on the prism 73a from a total of 27 layers wherein odd-numbered ones as counted from the prism 73a are made of TiO$_2$ while even-numbered ones are made of SiO$_2$. The filters 74a and 76a have such a characteristic as seen in FIG. 8A while the filter 75a has such a characteristic as seen in FIG. 8B.

Subsequently, a wavelength-division multiplexing module on the subscriber side is described. The wavelength-division multiplexing module on the subscriber side includes a photodetector assembly 60b which includes a photodetector 61b such as a photodiode for detecting light of a wavelength 1.31 $\mu$m and a condensing lens 62b both fixedly held in a predetermined positional relationship in a cylindrical casing. The wavelength-division multiplexing module includes another light emitting element assembly 63b which includes a light emitting element 64b such as a laser diode for emitting light of a wavelength 0.78 $\mu$m and a collimate lens 65b both fixedly held in a predetermined positional relationship in another cylindrical casing. The wavelength-division multiplexing module further includes another photodetector assembly 66b which includes a photodetector 67b such as a photodiode for detecting light of a wavelength 1.55 μm and a condensing lens 68b both fixedly held in a predetermined positional relationship in a further cylindrical casing. The wavelength-division multiplexing module further includes a fiber collimator 69b which includes a ferrule 70b having a small hole formed therein in which the other end portion of the optical fiber 71 and a condensing and collimating lens 72b are securely inserted in a predetermined positional relationship in a still further casing. The assemblies 60b, 63b and 66b and fiber collimator 69b are secured to an upper flat face of a board not shown, for example, by means of soldering.

The wavelength-division multiplexing module further includes an optical multiplexer/demultiplexer 78b of the filter type which includes a parallelogram prism 73b secured to the upper face of the board, a dielectric multilayer film filter 74b formed on a side face of the parallelogram prism 73b, and a pair of dielectric multilayer film filters 75b and 76b formed on the opposite side face of the parallelogram prism 73b. Each of the filters 74b, 75b and 76b is formed on the prism 73b from a total of 27 layers wherein odd-numbered ones as counted from the prism 73b are made of $TiO_2$ while even-numbered ones are made of $SiO_2$. The filters 74b and 76b have such a characteristic as seen in FIG. 8B while the filter 75b has such a characteristic as seen in FIG. 8A.

In the wavelength-division multiplexing optical transmission system, light of the wavelength 1.31 μm emitted from the light emitting element 61a which is driven to effect modulation by a driver circuit not shown on the central telephone exchange side is collimated by the lens 62a, passes through the filter 74a and is then introduced into the fiber collimator 69a whereupon it is condensed by the lens 72a and introduced into the end of the optical fiber 71 adjacent the lens 72a so that it is thereafter transmitted in the optical fiber 71. The transmission light emitted from the other end of the optical fiber 71 is collimated by the lens 72b and passes through the filter 75b so that it is subsequently introduced into the prism 73b, whereafter it passes through the filter 74b and is then condensed by the lens 62b and then detected by the photodetector 61b.

Similarly, light of the wavelength 1.55 μm emitted from the light emitting element 64a which is driven to effect modulation by another driver circuit not shown on the central telephone exchange side is collimated by the lens 65a and introduced into the prism 73a and then successively reflected by the filters 76a and 74a, whereafter it passes through the filter 75a and is condensed by the lens 72a and introduced into the end of the optical fiber 71 opposing to the lens 72a so that it is thereafter transmitted in the optical fiber 71. The transmission light emitted from the other end of the optical fiber 71 on the subscriber side is collimated by the lens 72b and reflected by the filter 75b, whereafter it is condensed by the lens 68b and then detected by the photodetector 67b.

On the other hand, light of the wavelength 0.78 μm from the light emitting element 63b which is driven to effect modulation by a driver circuit not shown on the subscriber side is reflected successively by the filters 76b and 74b and then passes through the filter 75b so that it is subsequently introduced into the fiber collimator 69b whereupon it is condensed by the lens 72b and then introduced into the end of the optical fiber 71 opposing to the lens 72b so that it is thereafter transmitted in the optical fiber 71. The transmission light emitted from the other end of the optical fiber 71 on the central telephone exchange side is collimated by the lens 72a and then reflected by the filter 75a, whereafter it is condensed by the lens 68a and detected by the photodetector 67a.

In this manner, with the wavelength-division multiplexing optical transmission system of the embodiment described above, a plurality of kinds of light having different wavelengths can be transmitted and received by combining or separating the light by means of the filters 74a, 75a and 76a and the filters 74b, 75b and 76b, and bidirectional optical communications can be accomplished between the central telephone exchange side and the subscriber side. Further, since the filters 74a, 75a, 76a and 74b, 75b, 76b formed on the parallelogram prisms 73a and 73b may be filters having such characteristics as seen in FIGS. 8A and 8B, any of them need not have a wide stopping band and accordingly can be produced readily, and consequently, the cost of the transmission system can be reduced.

It is to be noted that, while in the embodiment described above the light emitting element assembly 60a for emitting light of the wavelength 1.31 μm is disposed on the central telephone exchange side while the photodetector assembly 60b for detecting such light is disposed on the subscriber side, naturally the present invention is not limited to this, and the photodetector assembly 60b may be disposed on the central telephone exchange side while the light emitting element assembly 60a is disposed on the subscriber side. Also the light emitting element assembly 63a and the photodetector assembly 66b as well as the light emitting element assembly 63b and the photodetector assembly 66a may be disposed in the individually reverse relationship similarly. Further, the light emitting element assemblies and the photodetector assemblies may be replaced by optical fibers connected to some other suitable optical devices.

Figure 9:
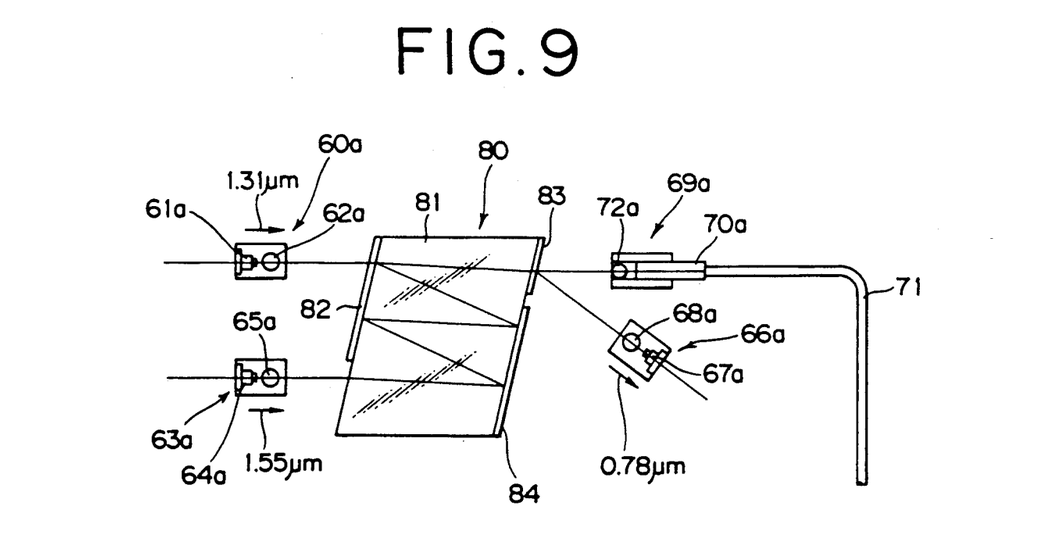
FIG. 9 is a schematic view showing construction of another optical multiplexer/demultiplexer of the filter type to which the present invention is applied.

Another optical multiplexer/demultiplexer of the filter type to which the present invention is applied is shown in FIG. 9. Referring to FIG. 9, the optical multiplexer/demultiplexer 80 of the filter type includes a parallelogram prism 81, a dielectric multilayer film filter 82 formed on a side face of the parallelogram prism 81 and having a greater size than that of the filters of the optical multiplexer/demultiplexers shown in FIG. 7, and another dielectric multilayer film filter 83 of the normal size and a further dielectric multilayer film filter 84 of the greater size both formed on the opposite side face of the parallelogram prism 81. Thus, light emitted from the light emitting element assembly 63a is reflected by a plurality of times by and between the filters 82 and 84 before it is introduced into the optical fiber 71. Generally, from the point of view of an arrangement of optical parts, for example, two light emitting element assemblies or a light emitting element assembly and a photodetector assembly must be disposed in a spaced relationship by a certain distance from each other. Accordingly, with such construction wherein light is reflected only once between two filters as shown in FIG. 7, each prism must have a corresponding great size, but where the construction wherein light is reflected several times between two filters as seen from the arrangement of the optical multiplexer/demultiplexer shown in FIG. 9 is adopted, the distance between optical parts can be assured without increasing the overall size of each prism.

What is claimed is:

1. A wavelength-division multiplexing optical transmission system for transmitting light of wavelengths $\lambda_1$, $\lambda_2$ and $\lambda_3$ having a relationship $\lambda_1 < \lambda_2 < \lambda_3$ by way of a single optical fiber, comprising:

a first prism having a first side face and a second side face opposite to said first side face, said first side face having a first filter formed thereon while said second side face has second and third filters formed thereon;

a second prism having a third side face and a fourth side face opposite to said third side face, said third face having a fourth filter formed thereon while said fourth side face has fifth and sixth filters formed thereon;

said first, third and fifth filters having a characteristic that they transmit light of the wavelengths $\lambda_1$ and $\lambda_2$ but reflect light of the wavelength $\lambda_3$ while said second, fourth and sixth filters have another characteristic that they transmit light of the wavelengths $\lambda_2$ and $\lambda_3$ but reflect light of the wavelength $\lambda_1$;

an optical fiber disposed such that an end thereof is opposed to said second filter of said first prism and the other end thereof is opposed to said fifth filter of said second prism;

first optical device means provided adjacent said first side face of said first prism in an opposing relationship to said first filter and adapted to emit or receive light of the wavelength $\lambda_2$;

second optical device means provided adjacent said first side face of said first prism such that a light path thereof may be directed to said third filter of said first prism and adapted to emit or receive light of the wavelength $\lambda_3$;

third optical device means provided adjacent said second side face of said first prism such that a light path thereof may be directed to said second filter of said first prism and adapted to emit or receive light of the wavelength $\lambda_1$;

fourth optical device means provided adjacent said third side face of said second prism in an opposing relationship to said fifth filter and adapted to emit or receive light of the wavelength $\lambda_2$;

fifth optical device means provided adjacent said third side face of said second prism such that a light path thereof may be directed to said sixth filter of said second prism and adapted to emit or receive light of the wavelength $\lambda_1$; and sixth optical device means provided adjacent said fourth side face of said second prism such that a light path thereof may be directed to said fifth filter of said second prism and adapted to emit or receive light of the wavelength $\lambda_3$.

2. A wavelength-division multiplexing optical transmission system according to claim 1, wherein each of said first to third filters is a dielectric multilayer film filter formed from a total of a plural odd number of layers on said first prism such that each odd-numbered one of said layers is made of $TiO_2$ while each even-numbered one is made of $SiO_2$, and each of said fourth to sixth filters is a dielectric multilayer film filter formed from a total of a plural odd number of layers on said second prism such that each odd-numbered one of said layers is made of $TiO_2$ while each even-numbered one is made of $SiO_2$.

3. A wavelength-division multiplexing optical transmission system according to claim 1, wherein the wavelength $\lambda_1$ and 0.78 $\mu$m, $\lambda_2$ and 1.31 $\mu$m and $\lambda_3$ is 1.55 $\mu$m.

4. A wavelength-division multiplexing optical transmission system according to claim 1, wherein said first prism is disposed such that light may be reflected by a plurality of times between said first and third filters while said second prism is disposed such that light may be reflected by a plurality of times between said fourth and sixth filters.

5. An optical multiplexer/demultiplexer adapted to combine or separate light of wavelengths $\lambda_1$, $\lambda_2$ and $\lambda_3$ having a relationship $\lambda_1 < \lambda_2 < \lambda_3$, comprising:

a parallelogram prism having a first side face and a second side face opposite to said first side face;

a first filter formed on said first side face of said parallelogram prism and having a characteristic that said first filter transmits light of the wavelengths $\lambda_1$ and $\lambda_2$ but reflects light of the wavelength $\lambda_3$;

a second filter formed on said second side face of said parallelogram prism and having a characteristic that said second filter transmits light of the wavelengths $\lambda_2$ and $\lambda_3$ but reflects light of the wavelength $\lambda_1$; and a third filter formed on said second side face of said parallelogram prism and having a characteristic that said third filter transmits light of the wavelengths $\lambda_1$ and $\lambda_2$ but reflects light of the wavelength $\lambda_3$.

6. An optical multiplexer/demultiplexer adapted to combine or separate light of wavelengths $\lambda_1$, $\lambda_2$ and $\lambda_3$ having a relationship $\lambda_1 < \lambda_2 < \lambda_3$, comprising:

a parallelogram prism having a first side face and a second side face opposite to said first side face;

a first filter formed on said first side face of said parallelogram prism and having a characteristic that said first filter transmits light of the wavelengths $\lambda_2$ and $\lambda_3$ but reflects light of the wavelength $\lambda_1$;

a second filter formed on said second side face of said parallelogram prism and having a characteristic that said second filter transmits light of the wavelengths $\lambda_1$ and $\lambda_2$ but reflects light of the wavelength $\lambda_3$; and a third filter formed on said second side face of said parallelogram prism and having a characteristic that said third filter transmits light of the wavelengths $\lambda_2$ and $\lambda_3$ but reflects light of the wavelength $\lambda_1$.

* * * * *

UNITED STATES PATENT AND TRADEMARK OFFICE
CERTIFICATE OF CORRECTION

PATENT NO. : 5,005,935
DATED : April 9, 1991
INVENTOR(S) : Kunikane et al.

Figure 1:
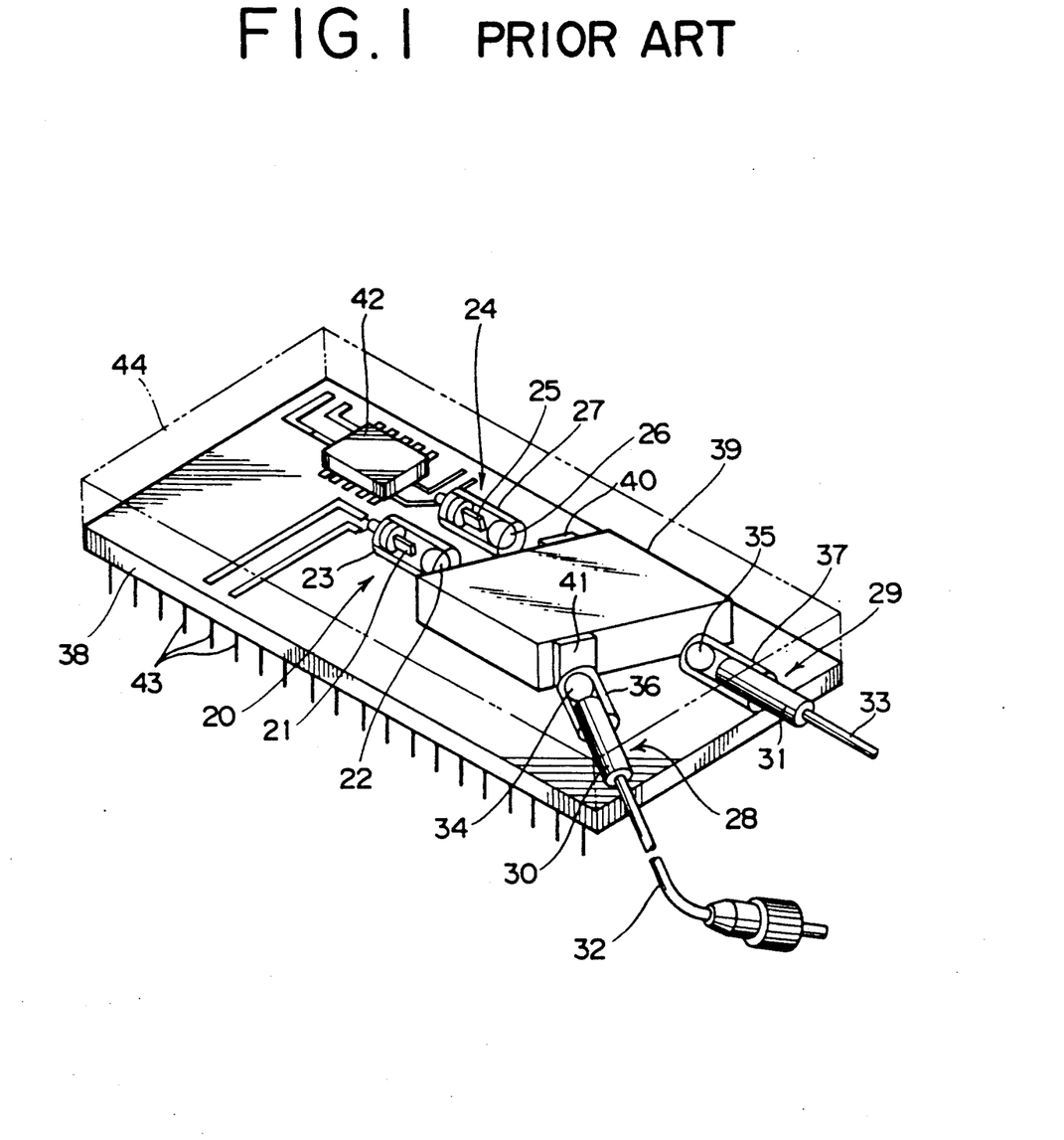
FIG. 1 is a schematic perspective view showing construction of a conventional wavelength-division multiplexing module.

It is certified that error appears in the above-identified patent and that said Letters Patent is hereby corrected as shown below:

Col. 3, line 31, insert --Fig. 2 is a plan view of the conventional wavelength-division multiplexing module of Fig. 1;--.

Col. 4, line 60, "34" should be --35--.

Col. 5, line 39, "0.178" should be --0.78--.

Col. 12, line 13, "and" (first and second occurrences) should be --is--.

Signed and Sealed this

Twenty-seventh Day of October, 1992

Attest:

DOUGLAS B. COMER

Attesting Officer      Acting Commissioner of Patents and Trademarks